United States Patent [19]
Butterfield et al.

[11] Patent Number: 5,012,164
[45] Date of Patent: Apr. 30, 1991

[54] HORIZONTAL DEFLECTION AND EHT GENERATOR CIRCUIT

[75] Inventors: John Butterfield, Wilsden; Stephen Moorhouse, Cullingworth; Stewart Marlow, Bolton, all of United Kingdom

[73] Assignee: Microvitec plc, Bradford, England

[21] Appl. No.: 520,752

[22] Filed: May 9, 1990

[30] Foreign Application Priority Data

May 10, 1989 [GB] United Kingdom ............... 8910728

[51] Int. Cl.$^5$ ............................................. H01J 29/70
[52] U.S. Cl. ...................................... 315/411; 315/408
[58] Field of Search ............................ 315/411, 408

[56] References Cited

U.S. PATENT DOCUMENTS

| 4,734,771 | 3/1988 | Lendaro et al. | 315/411 |
| 4,774,584 | 9/1988 | Schmadel | 315/411 |

Primary Examiner—Theodore M. Blum
Attorney, Agent, or Firm—David P. Gordon

[57] ABSTRACT

In a horizontal deflection and EHT generator circuit, the supply line is connected directly to one end of the primary winding of the EHT transformer through a series switching element, and a unidirectional element connects that end of the primary winding to the supply line to enable energy recovery to the supply line through the unidirectional element during and following retrace.

6 Claims, 2 Drawing Sheets

HORIZONTAL DEFLECTION AND EHT GENERATOR CIRCUIT

This invention relates to a combined horizontal deflection and EHT generator circuit for effecting a raster scan in a cathode ray tube used in a monitor or television receiver.

A prior art circuit of this type comprises a voltage regulator, or B+ regulator, which derives a d.c. voltage (B+) for the horizontal deflection and EHT generator sections of the circuit. The voltage regulator comprises a switching transistor connected in series on the supply line, followed by a filter consisting of a series inductance and a capacitor shunting to the ground. The circuit further comprises an EHT transformer having a primary winding connected at one end to the downstream side of the filter inductance and having its other end connected to ground through another switched transistor. This other end of the transformer primary winding is connected through the horizontal deflection coils to a capacitor and a tuning capacitor is connected across this further switched transistor. A steadily increasing current flows through the deflection coils (producing the line trace) until this further switched transistor is turned off, whereupon the retrace occurs and also a voltage peak, or retrace pulse, occurs and is applied to the primary winding. The stepped up pulse appearing in the secondary winding is peak-rectified to provide the EHT.

Energy loss occurs in the deflection coils and associated components during trace and would result in a degenerative action unless this energy were replaced during the retrace. It is known to control the current in the primary winding of the EHT transformer by pulse width modulation during retrace, so as to control the amount of energy available during trace. However, very small duty cycles and therefore high peak currents are involved, so that this technique is generally difficult especially in colour monitors.

We have now devised a combined horizontal deflection and EHT generator circuit which avoids these difficulties and also is simplified relative to the prior art circuit described above by omitting the filter which consists of the series inductance and shunt capacitor.

In accordance with this invention, there is provided a horizontal deflection and EHT generator circuit in which a supply line is connected directly to one end of a primary winding of an EHT transformer through a series switching element, a unidirectional element connecting said end of the primary winding to said supply line or to another supply line to enable energy recovery to that supply line through the unidirectional element during and following retrace.

This circuit is therefore simplified relative to the prior art circuit by omitting the LC filter between the switching transistor and the EHT transformer primary, but instead providing the unidirectional element, which may simply comprise a diode connected in parallel with the switching element (e.g. a transistor) but in opposite sense. The simplified circuit saves cost without any loss in function.

An embodiment of this invention will now be described, by way of example only and with reference to the accompanying drawings, in which.

Figure 1:
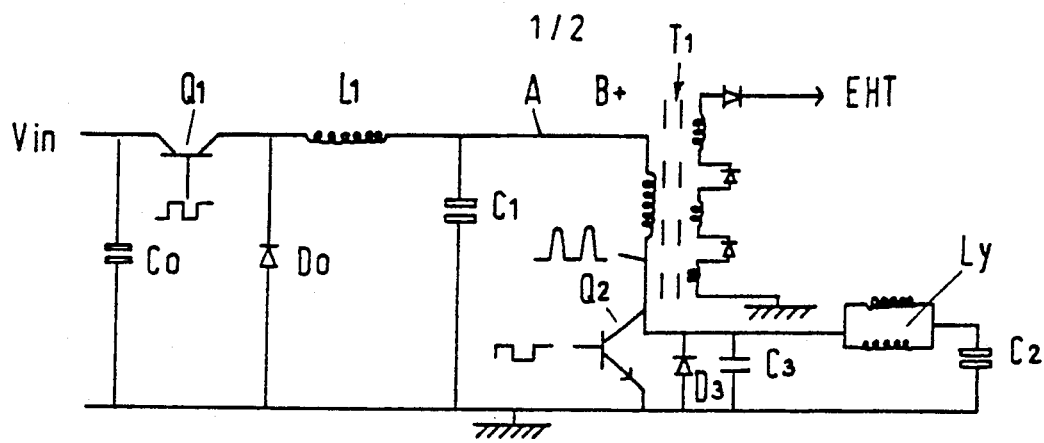
FIG. 1 is a diagram of a prior art combined horizontal deflection and EHT generator circuit.

Referring to FIG. 1, there is shown a typical prior art circuit which comprises a combined horizontal deflection and EHT generator circuit for a cathode ray tube employed in a monitor or television receiver. This prior art circuit includes a voltage regulator providing a regulated d.c. voltage B+. The regulator comprises a transistor Q1, an input voltage Vin being applied between the collector of this transistor and the ground rail. The emitter of transistor Q1 is connected to a filter comprising a series inductance L1 and a capacitor C1 connected between the downstream side of L1 and the ground rail. A capacitor Co is also connected between the collector of transistor Q1 and the ground rail and a diode Do is connected with its cathode to the junction between transistor Q1 and the inductance L1 and with its anode to ground. A pulse switching drive is applied to the base of transistor Q1 and the effect is to provide a steady voltage B+ at the output A of the regulator. The value of the voltage B+ is determined by the duty cycle $\delta$ of the transistor Q1 such that B+ = $\delta$ Vin. The voltage B+ can be regulated by feedforward or feedback acting to modify the duty cycle $\delta$ of transistor Q1 so as to render the voltage B+ constant. If the duty cycle of transistor Q1 is made proportional to the frequency of horizontal synchronising pulses in the received signal with Vin constant, then a voltage B+ proportional to the horizontal scanning frequency would be achieved, rendering the circuit suitable for variable horizontal scanning rates, as described in our European patent specification No. 0 254 573.

The combined horizontal deflection and EHT generator circuit shown in FIG. 1 further comprises an EHT transformer T1, the primary winding of which has one end connected to the output A of the B+ regulator and its other end connected to the collector of a transistor Q2 which has its emitter connected to ground. The secondary winding of the EHT transformer T1 has one end connected to ground and the winding includes series diodes such that it provides a rectified EHT output. The horizontal deflection coils Ly of the cathode ray tube are connected between the collector of transistor Q2 and one side of a capacitor C2, the other side of which is connected to ground. A tuning capacitor C3 is connected from the collector of transistor Q2 to ground and a diode D3 is connected with its cathode to the collector of transistor Q2 and its anode to ground.

Figure 2:
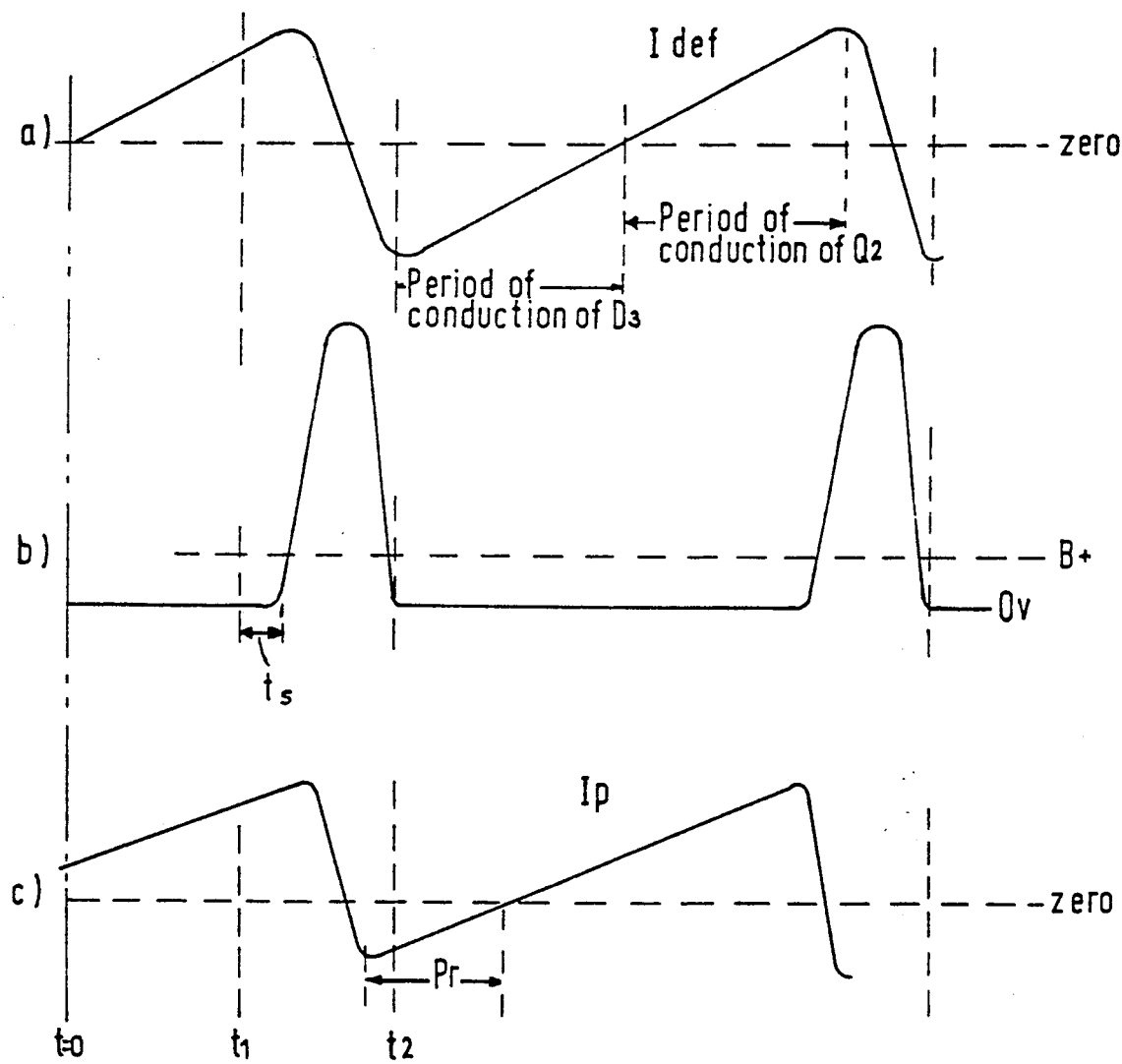
FIG. 2 is a diagram to illustrate certain waveforms occuring in the circuit of FIG. 1.

In operation of the prior art circuit shown in FIG. 1, the waveforms shown in FIG. 2 are typically found. With a regulated B+ voltage appearing at A (as explained above), suppose initially that the horizontal transistor Q2 is non-conductive, so that capacitor C2 is charged to the voltage B+. Suppose then at time t=0, base current is supplied to transistor Q2 to render it conductive: the deflection current Idef shown at (a) in FIG. 2 then begins to flow through the deflection coils Ly. At time t1, the base current to transistor Q2 is switched off. However, because of stored minority carrier charge transistor Q2 continues to conduct for a further period (or storage time) ts. At the end of this further period the transistor Q2 ceases to conduct. The energy at this time stored in the horizontal deflection coils prevents the coil current falling instantaneously to zero. This energy is transferred to the capacitor C3 in the form of a sinusoidally oscillating current producing a half-sinusoidal retrace voltage as shown at (b) in FIG. 2. The peak of this retrace voltage waveform corresponds to the instant that the deflection coil current I def has fallen to zero. The sinusoidal waveform of this current continues and reaches a peak in the opposite direction at the time t2. the retrace voltage waveform shown at (b) in FIG. 2 is prevented from increasing in the negative direction by the diode D3, which becomes forward biassed at time t2. The deflection coil current Idef now starts to reduce in consequence of a potential B+ on capacitor C3. By the end of the retrace, all the energy has been transferred from capacitor C3 to the magnetic field of the deflection coils Ly. Capacitor C2 now acts to increase the deflection current Idef at constant rate through zero and to a peak in the opposite direction until the trace cycle is terminated as previously, by turning off transistor Q2. The cycles repeat provided the transistor Q2 is switched on, in each cycle, before the zero-crossing of the deflection coil current Idef.

The B+ voltage at A in the prior art circuit of FIG. 1 supplies energy to the circuit to make up losses which occur in practice during the operation described above. Thus energy lost during the trace period in the circuit Ly, C2, Q2 and D3 is topped up from the B+ supply by energy stored in the primary of transformer T1 so that the deflection coil current is maintained. The secondary winding of the transformer T1 provides the EHT by peak rectification of the stepped up retrace pulse shown at (b) in FIG. 2.

A current Ip of similar waveform flows in the primary winding of the EHT transformer T1, as shown at (c) in FIG. 2. It will be seen that a net positive current is provided from the B+ supply, but for a period shown as Pr at (c) in FIG. 2, there is a recovery of energy to the B+ supply.

The above description of the prior art circuit of FIG. 1 is given by way of background explaination of the essential principles of its operation and is limited to a consideration of first order effects.

Figure 3:
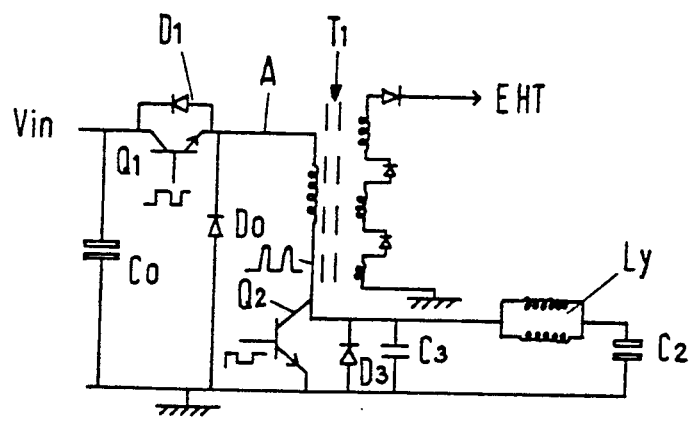
FIG. 3 is a diagram of a combined horizontal deflection and EHT generator circuit in accordance with this invention.

Referring to FIG. 3 of the accompanying drawings, there is shown a combined horizontal deflection and EHT generator circuit in accordance with this invention. This circuit corresponds to the prior art circuit shown in FIG. 1, with the modification that the filter comprising inductance L1 and capacitor C1 is removed, and a diode D1 is connected in anti-parallel with the switching transistor Q1. Thus the voltage at the output of the switching transistor Q1 is applied directly to the primary winding of the EHT transformer T1. However, the diode D1 is needed to allow energy recovery to take place. The diode D1 (or an alternative unidirectional element) may be connected as shown to allow energy recovery to the supply line feeding the circuit, or may be connected to some other supply line to provide for energy recovery to that line instead.

Figure 4:
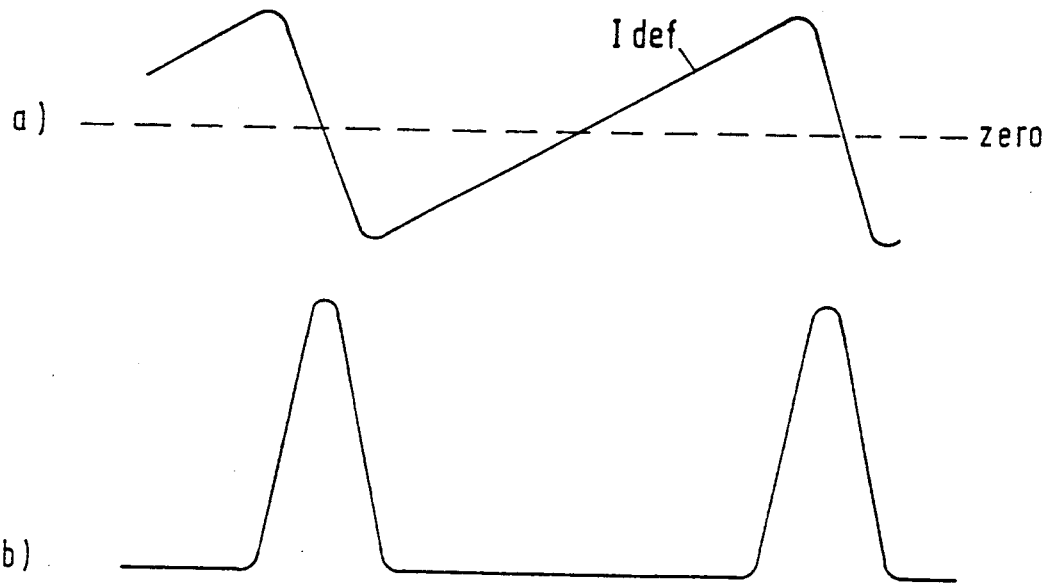
FIG. 4 is a diagram to illustrate certain waveforms occuring in the circuit of FIG. 3.
Figure 4:
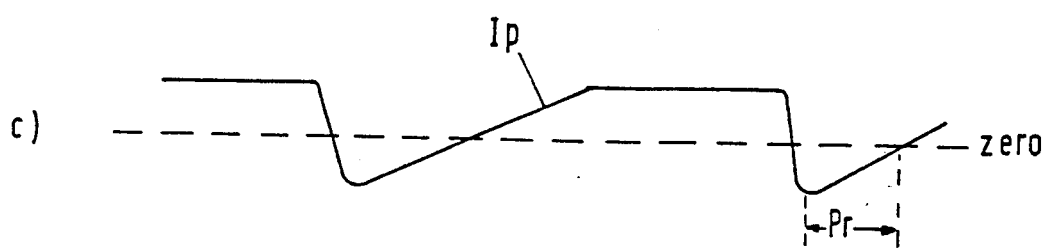

FIG. 4 shows at (a) the current Idef which flows in the deflection coils Ly of the circuit of FIG. 3, at (b) the retrace pulse which appears at the junction of the transformer primary and the collector of the horizontal transistor Q2, at (c) the current Ip which flows through the transformer primary, and at (d) the base current driving the transistor Q1. The energy recovery takes place through diode D1 during the period Pr indicated in FIG. 4. Preferably as shown transistor Q1 is off until after the retrace pulse. Whilst the transistor Q1 is off during trace, the energy in the primary winding of the transformer T1 is effectively trapped at the value it would have had in the prior art circuit immediately prior to the retrace. This is because the voltage across the primary winding of the transformer is very small compared with the other part of the cycle and hence the rate of change of its current Ip is very small.

The circuit of FIG. 3 is thus simplified relative to the prior art circuit of FIG. 1, with significant saving in cost but no loss in function. We have tested a variable frequency monitor incorporating the circuit of FIG. 3 and this operated successfully over the frequency range 15 to 40 k Hz, providing a substantially constant high voltage output and deflection amplitude over that range. The voltage appearing across capacitor C2 is equal to $\delta$ Vin, where $\delta$ is the duty cycle of the switching transistor Q1 and Vin is the voltage applied to the circuit, just as in the prior art circuit of FIG. 1.

The circuit of FIG. 3 may be employed in a fixed frequency application such as a television receiver. Then the circuit has only one major wound component, the EHT transformer, and can be designed to stabilise the EHT and horizontal deflection amplitude over a wide range of mains supply, typically from 90 to 270 volts AC. It is necessary however for the trace voltage required by the deflection system to be lower than the maximum DC which is rectified from the AC supply. The switching transistor Q1 would be driven with a variable duty cycle square wave synchronous with the drive to the horizontal transistor Q2, the duty cycle to transistor Q1 being controlled by the retrace pulse amplitude, or by feedforward in dependence on the supply voltage Vin.

What is claimed is:

1. A horizontal deflection and EHT generator circuit, comprising a transformer having a primary winding and a secondary winding, the primary winding having first and second terminals, a horizontal deflection coil having first and second ends, the first end of the deflection coil being connected to said second terminal of the primary winding, a supply terminal for connection to a supply line, a first switching means directly connecting said supply terminal to the first terminal of the primary winding, a second switching means connected to said second terminal of the primary winding, a capacitor means connected to said second end of the deflection coil, and a unidirectional element connecting said first terminal of the primary winding to said supply terminal to enable energy recovery to the supply line through said unidirectional element during and following retrace.

2. A horizontal deflection and EHT generator circuit as claimed in claim 1, further comprising a rail to which said second switching means connects said second terminal of the primary winding, said capacitor means being connected between said rail and said second end of the deflection coil.

3. A horizontal deflection and EHT generator circuit as claimed in claim 2, comprising a unidirectional element connected in antiparallel across said second switching means.

4. A horizontal deflection and EHT generator circuit as claimed in claim 1, further comprising means for periodically rendering said second switching means conductive for a predetermined period of time.

5. A horizontal deflection and EHT generator circuit as claimed in claim 1, further comprising means for periodically rendering said first switching means conductive for a predetermined interval of time.

6. A horizontal deflection and EHT generator circuit, comprising a transformer having a primary winding and a secondary winding, the primary winding having first and second terminals, a horizontal deflection coil having first and second ends, the first end of the deflection coil being connected to said second terminal of the primary winding, a first supply terminal for connection to a first supply line, a first switching means directly connecting said first supply terminal to the first terminal of the primary winding, a second switching means connected to said second terminal of the primary winding, a capacitor means connected to said second end of the deflection coil, a second supply terminal for connection to a second supply line, and a unidirectional element connecting said first terminal of the primary winding to said second supply terminal to enable energy recovery to said second supply line through said unidirectional element during and following retrace.

* * * * *